D. D. WHITNEY
Thill-Coupling.
No. 200,591.  Patented Feb. 19, 1878.
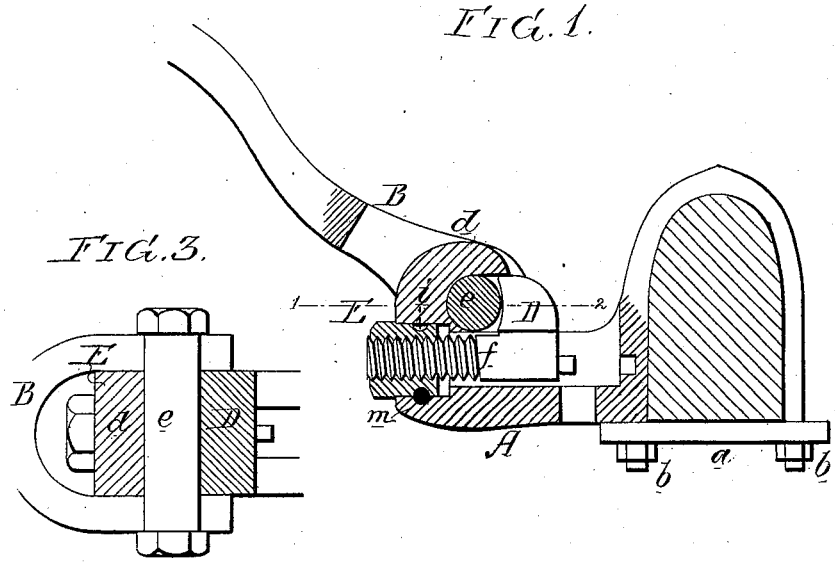
FIG. 1.
FIG. 3.
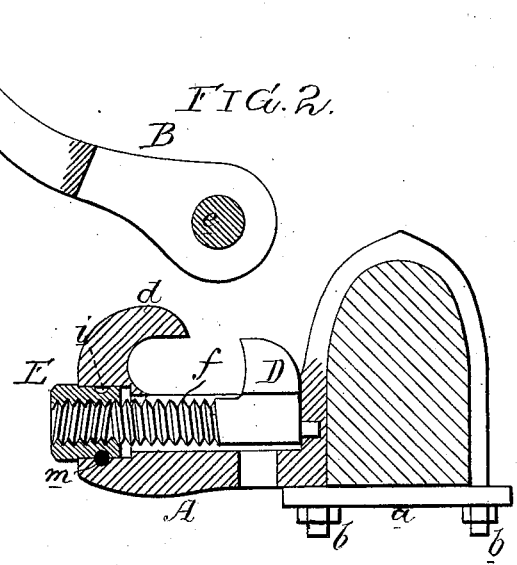
FIG. 2.
Witnesses,
Harry Smith
Thomas McIlvain
Inventor
Daniel D. Whitney
by his Attorneys
Howson and Son

UNITED STATES PATENT OFFICE.

DANIEL D. WHITNEY, OF BEVERLY, NEW JERSEY.

IMPROVEMENT IN THILL-COUPLINGS.

Specification forming part of Letters Patent No. 200,591, dated February 19, 1878; application filed January 16, 1878.

*To all whom it may concern:*

Be it known that I, DANIEL D. WHITNEY, of Beverly, Burlington county, New Jersey, have invented a new and useful Improvement in Thill-Couplings, of which the following is a specification:

The objects of my invention are to construct a strong and durable thill-coupling for vehicles, to prevent rattling of the same, and to readily compensate for the effects of wear—objects which I attain in the following manner, reference being had to the accompanying drawing, in which—

Figures 1 and 2 are sectional views of my improved thill-coupling with the movable parts in different positions; and Fig. 3, a sectional plan on the line 1 2, Fig. 1.

A is a block or frame, having a yoke adapted to the axle, to which it is secured by means of a plate, $a$, and nuts $b$. On the front of the block A is formed a hook, $d$, to which is adapted the bolt $e$, carried by the forked thill-iron B, the latter being attached to the pole or shaft in the usual manner. In the block A is formed a slot, to which is adapted a stem, $f$, on a sliding block, D, said stem being threaded and adapted to a nut, E, which has a tubular extension, fitted to an opening in the face of the block A.

The tubular extension of the nut E has an annular recess, $i$, formed in it, and to this recess is adapted the transverse pin $m$, which thus serves to prevent all longitudinal movement of the nut, without interfering with the free rotation of the same, the effect of the latter movement being, therefore, to cause the backward and forward movement of the sliding block D.

In coupling the pole or shaft to the vehicle with the above-described device, the nut E is first turned so as to force the block D back to its fullest extent, as shown in Fig. 2.

The bolt $e$ of the thill-iron is then introduced into position in the hooked portion $d$ of the block A, and the nut E turned so as to cause the forward movement of the block D, which presses upon the bolt $e$, and forces it firmly into the said hooked portion $d$, so as to effectually prevent rattling.

When any of the working parts become worn, a slight turn of the nut E will be sufficient to cause such a forward movement of the block D as will insure a close contact of the bolt $e$ with the same and the hook $d$.

The bearing-face of the block D is made comparatively flat, so that it will bear on the bolt $e$ until the latter is worn almost entirely away. The block D being at the rear of the bolt $e$, the forward strain or pull upon the latter is not exerted upon the said block, but upon the hook $d$ of the block A, which is strong enough to effectually resist such strain.

In some cases the block A may have lugs, connected by a transverse bolt, to which a hook on the thill-iron B is adapted, the block D in this case bearing against the hook on the thill-iron, and forcing it against the bolt carried by the block A.

I do not desire to claim, broadly, a sliding clamping-block having a threaded stem adapted to an operating-nut; but

I claim as my invention—

The combination of the block A and the thill B, constructed and adapted to each other as described, with the sliding block D and its threaded stem $f$, the recessed tightening-nut E, and the pin $m$, for preventing longitudinal movement of said nut, all substantially as set forth.

In testimony whereof I have signed my name to this specification in the presence of two subscribing witnesses.

DANIEL D. WHITNEY.

Witnesses:
HARRY A. CRAWFORD,
HARRY SMITH.